US012632876B2

(12) United States Patent
Tsvieli et al.

(10) Patent No.: US 12,632,876 B2
(45) Date of Patent: May 19, 2026

(54) RATIO PREDICTION USING MACHINE LEARNING MODELS EMPLOYING STRICT CONVEX LOSS FUNCTIONS AND PROXIMAL POINT OPTIMIZATION

(71) Applicant: YAHOO ASSETS LLC, New York, NY (US)

(72) Inventors: Amit Tsvieli, Haifa (IL); Alex Shtoff, Haifa (IL)

(73) Assignee: YAHOO ASSETS LLC, New York, NY (US)

( * ) Notice: Subject to any disclaimer, the term of this patent is extended or adjusted under 35 U.S.C. 154(b) by 172 days.

(21) Appl. No.: 18/471,348

(22) Filed: Sep. 21, 2023

(65) Prior Publication Data

US 2025/0104101 A1 Mar. 27, 2025

(51) Int. Cl.
 *G06Q 30/02* (2023.01)
 *G06Q 30/0202* (2023.01)
 *G06Q 30/0273* (2023.01)
(52) U.S. Cl.
 CPC ..... *G06Q 30/0202* (2013.01); *G06Q 30/0275* (2013.01)
(58) Field of Classification Search
 None
 See application file for complete search history.

(56) References Cited

U.S. PATENT DOCUMENTS

| | | | |
|---|---|---|---|
| 2023/0123322 A1* | 4/2023 | Cella ................. | G05B 23/0283 |
| | | | 700/29 |
| 2024/0257209 A1* | 8/2024 | Wang ................. | G06Q 30/0631 |
| 2025/0104101 A1* | 3/2025 | Tsvieli .............. | G06Q 30/0202 |

OTHER PUBLICATIONS

Ahn et al. (Understanding Nesterov's Acceleration via Proximal Point Method; Department of Electrical Engineering and Computer Science, Massachusetts Institute of Technology, kjahn@mit.edu. This work was done as the author's class project for 6.881 Optimization for Machine Learning at MIT, Spring 2020, pp. 117-1.*

* cited by examiner

*Primary Examiner* — Matthew D Henry
(74) *Attorney, Agent, or Firm* — James J. DeCarlo; Greenberg Traurig, LLP

(57) ABSTRACT

In some implementations, the techniques described herein relate to a method including: receiving a training data set, the training data set including data representing consumer interactions and actions taken by consumers after the consumer interactions; executing a training run using a predictive model, the predictive model including a plurality of trainable parameters; computing a loss of the training run using a loss function, the loss function including a strict convex function; optimizing the plurality of trainable parameters based on an output of the loss function; storing the trainable parameters as an inference model; and predicting a future ratio using the inference model.

20 Claims, 5 Drawing Sheets

Retrieve Historical Data 402

Generate Feature Vector 404

Input Vector to Model, Obtain Prediction 406

Modify Current Strategy 408

Monitor Performance 410

Update Strategy Based on Performance 412

RATIO PREDICTION USING MACHINE LEARNING MODELS EMPLOYING STRICT CONVEX LOSS FUNCTIONS AND PROXIMAL POINT OPTIMIZATION

BACKGROUND

Current recommendation systems are frequently designed to maximize a desired outcome while ensuring compliance with constraints placed by users of such systems. For example, a cloud data center may wish to optimize a virtual machine to server ratio based on historical data. However, current approaches generally are limited to statistical analysis and fail to account for rapidly changing data environments.

DETAILED DESCRIPTION

Figure 1:
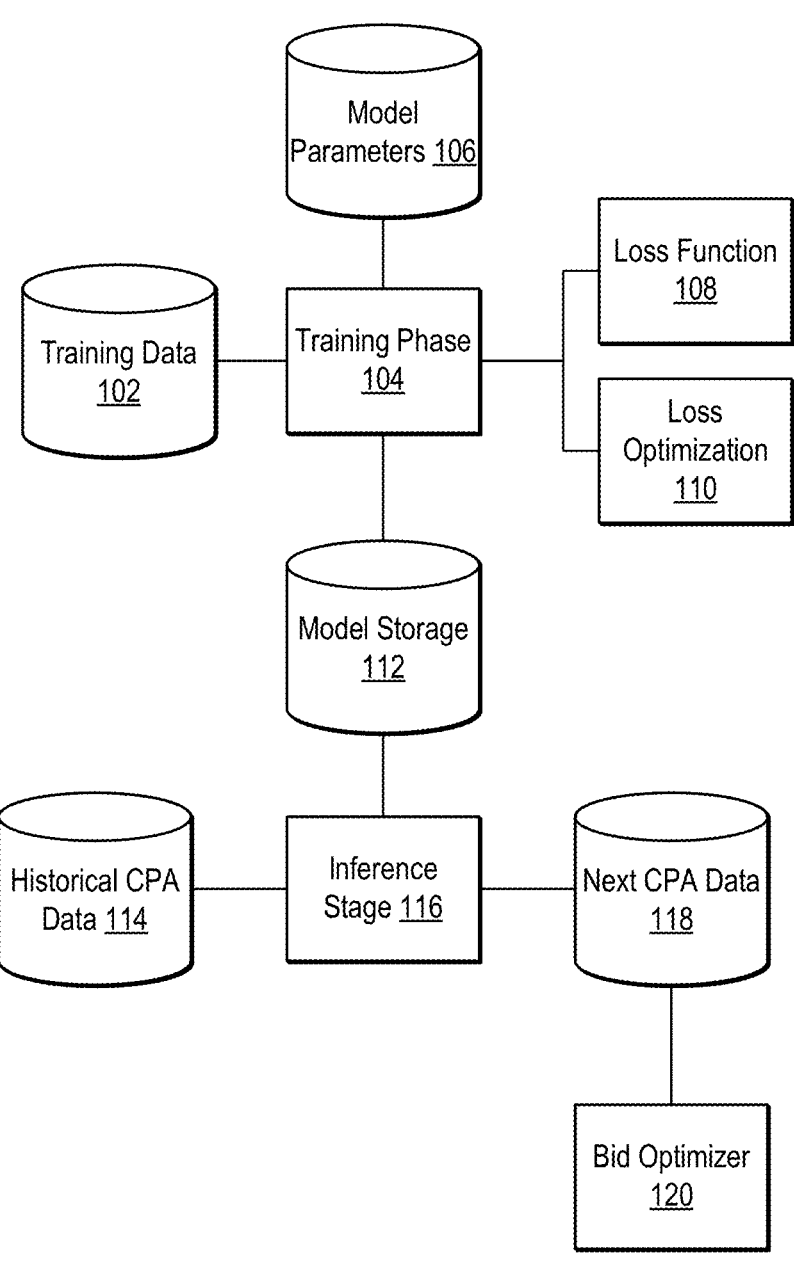
FIG. 1 is a block diagram of a content serving system according to some of the example embodiments.

As a result of the foregoing deficiencies, current recommendation systems often attempt to "estimate" a ratio between a desired outcome (e.g., conversions) and a provided input (e.g., amount paid). For example, in some systems, a user (e.g., an advertiser) can submit a bid (e.g., cost-per-click) wherein a real-time bidding system can serve content based on this bid. In such systems, a small percentage of traffic is served using the user-provided bid while the remaining traffic is served using an algorithmically selected bid. In some implementations, this bid can be selected based on computing a ratio (e.g., cost-per-conversion) between the desired outcome (e.g., conversion) and the input (e.g., amount spend). Once this ratio is computed, the remaining traffic can use the ratio to dynamically update the bid (e.g., cost-per-click) in real-time and without human intervention.

In these systems, the calculation of the ratio is thus a critical step in downstream processing. Current approaches to computing this ratio are lacking and are generally implemented as running ratios of averages computed using historical data. Such an approach may be implemented as an online ratio estimation routine which can compute a running average of both the conversions and the costs and dividing these values to compute the current ratio. Usually, a single decay factor is used to prioritize more recent data. Such an approach however is limited in its application and includes only a single factor that is tunable to improve performance. This problem is especially notable in real-time systems where the data distribution (e.g., conversions and clicks) changes over time.

As such, it would be desirable to employ more advanced predictive models to predict, for a current or future time step, a ratio between two values. While the disclosure uses a cost-per-conversion ratio as an example, the disclosure is not limited as such and indeed any ratio can be computed using the methods herein. In some implementations, the disclosure can be utilized with any predictive model (e.g., a linear model, a deep neural network, etc.) provided it satisfies the constraints defined herein. The specific model is not limited, however the loss function embodiments described herein may be utilized to train such models.

In some implementations, the techniques described herein relate to a method including: receiving a training data set, the training data set including data representing consumer interactions and actions taken by consumers after the consumer interactions; executing a training run using a predictive model, the predictive model including a plurality of trainable parameters; computing a loss of the training run using a loss function, the loss function including a strict convex function; optimizing the plurality of trainable parameters based on an output of the loss function; storing the trainable parameters as an inference model; and predicting a future ratio using the inference model.

In some implementations, the techniques described herein relate to a method, wherein the loss function is selected from a family of functions within a function space defined by a difference between outcomes of actions taken after consumer interactions multiplied by a strict convex function of the predicted outcome and the predicted outcome of the consumer interactions.

In some implementations, the techniques described herein relate to a method, wherein the outcomes of actions are computed by computing a total number of actions within a predetermined time period and where the consumer interactions are computed by summing a total number of consumer interactions in the predetermined time period.

In some implementations, the techniques described herein relate to a method, wherein optimizing the plurality of trainable parameters based on an output of the loss function includes minimizing a regularized version of the loss function after the training run.

In some implementations, the techniques described herein relate to a method, wherein minimizing a regularized version of the loss function after the training run includes utilizing a proximal point method.

In some implementations, the techniques described herein relate to a method, wherein the plurality of trainable parameters are updated to next trainable parameters by finding a minimum value of a combination of the loss function, a first regularization term that represents a deviation between the plurality of trainable parameters and previous trainable parameters, and a second regularization term that evaluates a magnitude of the plurality of trainable parameters.

In some implementations, the techniques described herein relate to a method, wherein the method further includes updating a bid for a future consumer interaction using the future ratio.

In some implementations, the techniques described herein relate to a non-transitory computer-readable storage medium for tangibly storing computer program instructions capable of being executed by a computer processor, the computer program instructions defining steps of: receiving a training data set, the training data set including data representing consumer interactions and actions taken by consumers after the consumer interactions; executing a training run using a predictive model, the predictive model including a plurality of trainable parameters; computing a loss of the training run using a loss function, the loss function including a strict convex function; optimizing the plurality of trainable parameters based on an output of the loss function; storing the trainable parameters as an inference model; and predicting a future ratio using the inference model.

In some implementations, the techniques described herein relate to a non-transitory computer-readable storage medium, wherein the loss function is selected from a family of functions within a function space defined by a difference between outcomes of actions taken after consumer interactions multiplied by a strict convex function of the predicted outcome and the predicted outcome of the consumer interactions.

In some implementations, the techniques described herein relate to a non-transitory computer-readable storage medium, wherein the outcomes of actions are computed by computing a total number of actions within a predetermined time period and where the consumer interactions are computed by summing a total number of consumer interactions in the predetermined time period.

In some implementations, the techniques described herein relate to a non-transitory computer-readable storage medium, wherein optimizing the plurality of trainable parameters based on an output of the loss function includes minimizing a regularized version of the loss function after the training run.

In some implementations, the techniques described herein relate to a non-transitory computer-readable storage medium, wherein minimizing a regularized version of the loss function after the training run includes utilizing a proximal point method.

In some implementations, the techniques described herein relate to a non-transitory computer-readable storage medium, wherein the plurality of trainable parameters are updated to next trainable parameters by finding a minimum value of a combination of the loss function, a first regularization term that represents a deviation between the plurality of trainable parameters and previous trainable parameters, and a second regularization term that evaluates a magnitude of the plurality of trainable parameters.

In some implementations, the techniques described herein relate to a non-transitory computer-readable storage medium, wherein the steps further include updating a bid for a future consumer interaction using the predicted ratio.

In some implementations, the techniques described herein relate to a device including: a processor; and a storage medium for tangibly storing thereon logic for execution by the processor, the logic including instructions for: receiving a training data set, the training data set including data representing consumer interactions and actions taken by consumers after the consumer interactions, executing a training run using a predictive model, the predictive model including a plurality of trainable parameters, computing a loss of the training run using a loss function, the loss function including a strict convex function, optimizing the plurality of trainable parameters based on an output of the loss function, storing the trainable parameters as an inference model, and predicting a future ratio using the inference model.

In some implementations, the techniques described herein relate to a device, wherein the loss function is selected from a family of functions within a function space defined by a difference between outcomes of actions taken after consumer interactions multiplied by a strict convex function of the predicted outcome and the predicted outcome of the consumer interactions.

In some implementations, the techniques described herein relate to a device, wherein the outcomes of actions are computed by computing a total number of actions within a predetermined time period and where the consumer interactions are computed by summing a total number of consumer interactions in the predetermined time period.

In some implementations, the techniques described herein relate to a device, wherein optimizing the plurality of trainable parameters based on an output of the loss function includes minimizing a regularized version of the loss function after the training run.

In some implementations, the techniques described herein relate to a device, wherein minimizing a regularized version of the loss function after the training run includes utilizing a proximal point method.

In some implementations, the techniques described herein relate to a device, wherein the plurality of trainable parameters are updated to next trainable parameters by finding a minimum value of a combination of the loss function, a first regularization term that represents a deviation between the plurality of trainable parameters and previous trainable parameters, and a second regularization term that evaluates a magnitude of the plurality of trainable parameters.

FIG. 1 is a block diagram of a content serving system according to some of the example embodiments.

In the illustrated system, training subsystem includes training data store 102 and a training phase 104 that receives training data from data store 102 and reads and write model parameter updates to model parameter store 106. As illustrated, the training phase 104 utilizes a loss function 108 and a loss optimization algorithm 110. Loss function 108 can be customized based on the underlying model being trained. In some implementations, loss optimization algorithm 110 may comprise a proximal point algorithm.

After executing one or more training runs, the training phase 104 writes the final (or interim) model parameters (e.g., trainable parameters) to a persistent model storage device 112. In some implementations, an inference system can load these model parameters and predict data. Specifically, as illustrated, an inference stage 116 can read data from a historical CPA data storage device 114, generate feature vectors, input those feature vectors into the trained model, and output the next time step's CPA to a next CPA data store 118. In some implementations, downstream subsystems, such as an ad-tech platform can use these predicted CPA values to perform automated actions. For example, a bid optimizer 120 can adjust an user's bid strategy in such an ad-tech platform.

In some implementations, the training data store 102 can serve as a centralized repository for housing various datasets for model training. This storage component might accommodate both structured and unstructured data types, encompassing historical metrics, raw event logs, consumer interaction histories, and other relevant data fields pertinent to content serving. The design of training data store 102 is tailored to facilitate quick data retrieval and storage operations, ensuring that the training phase 104 receives timely and consistent data. The data contained within might be preprocessed, cleaned, and structured in a manner conducive to effective model training. Additionally, the training data store 102 can be equipped with mechanisms to update its contents periodically, reflecting the most recent data available, ensuring that model training leverages up-to-date information.

The training data store 102 can interface with external advertising platforms to ingest metrics, including click, impression, and conversion data. By establishing dedicated data pipelines or API integrations, the system can automatically pull or receive pushed data at predefined intervals or in real-time. This interoperability ensures that the training data store remains populated with comprehensive and current advertising performance metrics, enriching the training data used in subsequent model training phases.

In some implementations, the training phase 104 functions as the core computational unit responsible for training the predictive model. It accesses the training data from the training data store 102. Based on this data, it adjusts model parameters iteratively to minimize prediction errors. In some implementations, training phase 104 employs various algorithms suitable for the nature of the data and the intended prediction objectives. In certain cases, it reads initial model parameters or configurations from the model parameter store 106, refining these parameters during the training process. In some implementations, once training is complete, the training phase 104 commits the final model parameters to a persistent storage device, such as the model storage device 112. Specific details on training phase 104 are provided in FIG. 3.

In some implementations, the model parameter store 106 serves as a dedicated repository for storing intermediate and finalized model parameters. This store can retain values like weights, biases, and other tunable elements crucial for the model's operation. In certain cases, before a new training session, the training phase 104 retrieves initial parameters or configurations from the model parameter store 106, enabling continuation or refinement of previous training efforts. In some implementations, the model parameter store 106 can offer versioning capabilities, allowing for the maintenance and retrieval of multiple model states, facilitating iterative development and comparative evaluations. After training sessions, the updated parameters are stored back to this repository, ensuring consistent and updated parameter sets are available for both training and inference processes.

In some implementations, the loss function 108 quantifies the discrepancy between the model's predictions and the actual observed data. The loss function can be chosen based on the specific type of predictive model and the nature of the data. Specific details on strict convex loss functions suitable for ratio prediction are described more fully in FIG. 3. In some implementations, the loss function 108 integrates with the training phase 104, guiding the adjustment of model parameters to minimize the computed loss. The output from the loss function 108 subsequently informs the loss optimization algorithm 110 on how best to adjust the model parameters.

In some implementations, the loss optimization algorithm 110 is tasked with adjusting the model parameters to minimize the value provided by the loss function 108. One approach employed is the proximal point algorithm, particularly suitable for strict convex optimization problems. This method iteratively refines model parameters by considering both the current loss value and a regularization term, ensuring stable convergence and potentially preventing overfitting. In some contexts, especially when the loss function exhibits strict convex properties, the proximal point algorithm is used due to its robustness and efficiency. However, in other implementations, alternative optimization techniques optimized for strict convex loss functions, such as gradient descent or conjugate gradient methods, might also be employed, depending on specific system requirements and desired performance characteristics.

In some implementations, the persistent model storage device 112 functions as a long-term storage solution for retaining the final or interim model parameters generated by the training phase 104. Upon the completion of a training session, the trained parameters, representing the state of the model, are committed to this storage device. This ensures that the parameters are safely stored and readily available for subsequent training sessions or for utilization by the inference system. In some implementations, the storage device 112 supports data redundancy mechanisms, such as backup and replication, to prevent data loss. Furthermore, in certain configurations, the storage device 112 can provide efficient retrieval capabilities, allowing the inference stage 116 to quickly load model parameters when predicting data based on historical inputs.

In some implementations, the historical CPA data storage device 114 functions as a repository specifically designed to retain data points related to clicks and conversions from past advertising campaigns. This storage captures individual events or interactions, preserving a detailed record of consumer behaviors and ad interactions. When needed, especially during the prediction process, the system can synthesize the CPA by computing the ratio of total cost to total conversions for specified periods, such as the last N time periods. The inference stage 116 can then access this synthesized CPA data or directly retrieve the raw click and conversion data to generate feature vectors. In some implementations, the storage device 114 organizes data in chronological order or by specific time-segmented blocks, streamlining data access and supporting efficient computation of CPA metrics for varying time frames.

In some implementations, the inference stage 116 operates as the predictive component of the system, using the trained model parameters to make projections about future metrics, such as future CPA values. This stage sources its input data from the historical CPA data storage device 114, either in the form of synthesized CPA values or raw click and conversion data. Based on this data, it constructs feature vectors which are then inputted into the trained model. Utilizing the model parameters loaded from the persistent model storage device 112, the inference stage 116 computes predictions for the next designated time step, such as the next hour or day. In certain implementations, after generating these predictions, the inference stage communicates the projected CPA values to downstream systems or stores them in a designated repository like the next CPA data store 118 for subsequent utilization.

In some implementations, the next CPA data store 118 is a designated storage mechanism that holds the predicted CPA values generated by the inference stage 116. After producing a prediction for a forthcoming time step, the inferred CPA value is committed to this data store for easy retrieval and utilization. This storage ensures that the system has ready access to the most recent predictions when making decisions or adjustments. In certain configurations, the data store 118 might categorize and maintain predictions based on timestamps or other relevant identifiers, facilitating orderly access and aiding in potential retrospective analyses. Downstream systems, like the bid optimizer 120, can fetch these predictions from the next CPA data store 118 to make informed adjustments to ad bidding strategies or other related actions.

In some implementations, the bid optimizer 120 acts as a strategic module responsible for adjusting and refining ad bidding strategies based on the predicted CPA values sourced from the next CPA data store 118. Upon receiving a predicted CPA, the bid optimizer evaluates the current bidding strategy, identifying potential areas for adjustment to align with the forecasted CPA. Depending on the anticipated CPA value, the optimizer might increase, decrease, or maintain the bid amounts to achieve desired advertising outcomes. This dynamic adjustment ensures that the ad bids remain competitive and cost-effective, reflecting the changing landscape of the ad market. In certain implementations, the bid optimizer 120 integrates with external ad platforms, enabling automated bid submissions or adjustments in real-time, based on the insights drawn from the predicted CPA values.

As will be discussed, while online advertising is used as an example, the disclosure is not limited to this technical environment.

As one example, a healthcare management system leverages the architecture described in FIG. 1 to predict and adjust the patient-to-nurse ratio within a hospital setting. Historical patient admission and nurse scheduling data is collected and stored in a database analogous to data store 102. The training phase 104 utilizes this data to train a model aimed at predicting the patient-to-nurse ratio for upcoming shifts or days. By employing a specific loss function 108, the system gauges the accuracy of its predictions against past real-world ratios. Optimization of the model parameters is performed using an approach similar to the loss optimization algorithm 110, ensuring the model can handle the variability and demands of a medical facility. Once trained, these parameters are saved in a module equivalent to the persistent model storage device 112. For real-time predictions, the inference stage 116 fetches historical data from a storage component akin to historical CPA data storage device 114, predicts the patient-to-nurse ratio, and then commits these predictions to a repository similar to next CPA data store 118. An operational module, resembling bid optimizer 120, subsequently uses these predictions to suggest staffing adjustments or patient distribution strategies, ensuring optimal care without overburdening the nursing staff.

As another example, a cloud resource management system can leverage the architecture described in FIG. 1 to optimize the allocation of virtual machines (VMs) onto physical servers. The data store 102 archives historical data detailing the number of VMs deployed and the physical server utilization, capturing factors like CPU load, memory usage, and I/O throughput. This data aids the training phase 104 in creating a model designed to predict the ideal VM-to-server ratio for upcoming demands, ensuring optimal resource utilization without overloading servers. The loss function 108 measures the disparity between predicted allocations and actual server performance outcomes. An optimization technique, resembling the loss optimization algorithm 110, fine-tunes the model to ensure it offers accurate resource distribution recommendations in a dynamic cloud environment. Once the model is appropriately trained, its parameters are stored in a component similar to the persistent model storage device 112. For real-time resource allocation decisions, the inference stage 116 sources past deployment and utilization data from a component akin to historical CPA data storage device 114, predicts the optimal VM-to-server ratio for forthcoming demands, and saves these projections in a module resembling next CPA data store 118. A resource allocator, analogous to bid optimizer 120, then acts on these predictions to efficiently distribute VMs across the available physical servers, thereby maximizing resource utilization, ensuring responsive VM performance, and potentially reducing energy consumption.

As a third example, a data center cooling management system harnesses the architecture detailed in FIG. 1 to anticipate and adjust the temperature sensor-to-cooling unit ratio within a data center facility. The data store 102 maintains a log of historical temperature readings across various zones of the data center alongside the operational status and effectiveness of each cooling unit. Using this data, the training phase 104 crafts a model designed to predict the optimal sensor-to-cooling unit ratio, enabling the fine-tuning of cooling resources in response to varying heat loads, thereby maintaining the desired temperature range. The loss function 108 assesses the deviation between the model's predicted cooling requirements and the actual temperature outcomes in the data center. Through an optimization process akin to the loss optimization algorithm 110, the model parameters are adjusted to ensure accurate predictions under various operational and environmental conditions. Post-training, the model parameters find their storage place in a system analogous to the persistent model storage device 112. For on-the-spot cooling decisions, the inference stage 116 retrieves recent temperature and cooling data from a component resembling historical CPA data storage device 114. It then predicts the most effective sensor-to-cooling unit ratio and logs these estimations in an entity akin to next CPA data store 118. An intelligent cooling controller, parallel to bid optimizer 120, utilizes these predictions to adjust the operation of cooling units, ensuring an efficient and balanced cooling strategy across the data center.

Thus, the system of FIG. 1 can be re-configured and deployed in various environments and are not limited per se to advertising technologies. Functional details of the foregoing components are described more fully in FIGS. 2 through 4 which are not repeated herein.

Figure 2:
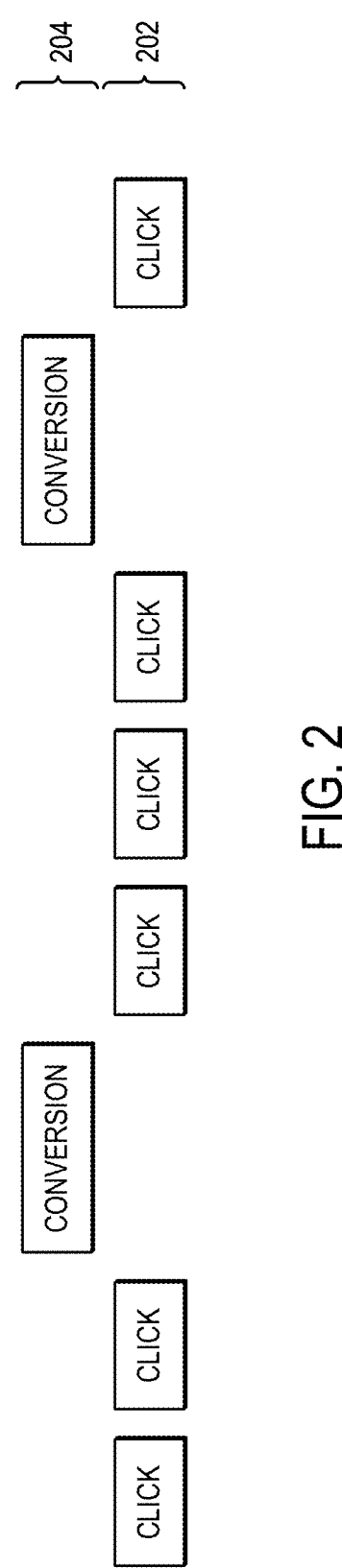
FIG. 2 is a block diagram illustrating a data stream used for ratio prediction according to some of the example embodiments.

FIG. 2 is a block diagram illustrating a data stream used for ratio prediction according to some of the example embodiments.

In an implementation, an example data stream can include two data points: clicks 202 and conversions 204. As illustrated, these data points are recorded over time.

In some implementations, clicks 202 can be recorded by an ad tech platform. For example, an user may place bids for the placement of content (e.g., creatives) on web pages or mobile applications. An ad tech platform can manage the placement of these creatives and monitor the slots filled. In some implementations, the ad tech platform can monitor for various events such as impressions, scrolls, and (notably) clicks. As used herein, a click refers to any proactive consumer action with respect to a content item including mouse clicks, tap events, keyboard presses, etc. Certainly, other non-proactive events (e.g., impressions, window closes, etc.) may also be used. In an ad tech system, an user may place a bid on an impression and only pay for a click, thus specifying two bids. However, the cost per click (e.g., bid for a click) is used to simplify the disclosure. When a consumer device displays a slot, the ad tech system is notified and an automatic process is initiated wherein multiple bidders place bids to present content in the slot. Notably, this process is extremely fast and explicitly cannot utilize human interactions or feedback given the speed at which a bidder is selected. This is the motivation for specifying a cost-per-click budget in advance and removing human interaction from the process. Such ad tech platforms are thus significantly different from traditional advertising methods which require human interaction. Once a winning (e.g., maximum) bid is chosen, the ad tech platform returns the creative over a network to the consumer device and the consumer device renders the content. In response, the consumer receiving the content may interact with the creative. Client-side code (or, in some implementations, server side code via redirects) monitors for this interaction and records a click event when an end-user selects a creative. Ultimately, the consumer is then redirected to a target webpage or application specified by the user. These interactions are recorded as clicks 202 by the ad tech platform and used to bill the user as well as monitor the campaign performance. Further, as will be discussed, they can be used to improve a bidding strategy without human intervention. Notably, as used herein in the examples, a "user" may refer to an advertiser while an "consumer" may refer to any computing device or user that receives an advertisement from the advertiser. Certainly, as described above, other types of users and consumers may be included in the embodiments.

Once the consumer is redirected to the web page or application, the consumer can perform many actions. Some of these actions can be tagged as conversions. Specifically, the user placing the winning bid may modify their web page or application to report back conversion events to the ad tech platform. For example, when an end-user completes a transaction (e.g., by selecting a "Submit Order" button), the user may transmit a notification to the ad tech platform identifying the conversion. In some implementations, the user can include a campaign identifier or other identifier to tie the conversion to the click. In other implementations, the ad tech platform can perform this association based on the data itself. These reports comprise the conversions 204.

In some implementations, these streams of data can be converted into a formal training data set. Specifically, the training data set comprises a series of examples having two values: whether a conversion occurred and a cost. Below is an example of such a training data set:

TABLE 1

| $x_i$ (conversion) | $y_i$ (cost) |
|---|---|
| 0 | $10 |
| 0 | $ 5 |
| 1 | $ 0 |
| . | . |
| . | . |
| . | . |

As illustrated in Table 1, when a click event is recorded, a training example is created having $x_i=0$ and $y_i$ equal to the cost-per-click value. Conversely, when a conversion is recorded, $y_i=0$ and $x_i=1$. Thus, clicks and conversions are decoupled in the training data. In some implementations, this training data can be constructed for a subset of all data (e.g., for a specific user, for a specific campaign, for a specific item of content, etc.).

Using this data, the historical cost-per-conversion (also referred to more generally as cost-per-action, CPA) can be computed as:

$$CPA = \frac{\sum_i y_i}{\sum_i x_i}$$

As will be discussed next, the example embodiments provide a method for training a learner model to predict the CPA value for a next time step given the training data set described above.

Figure 3:
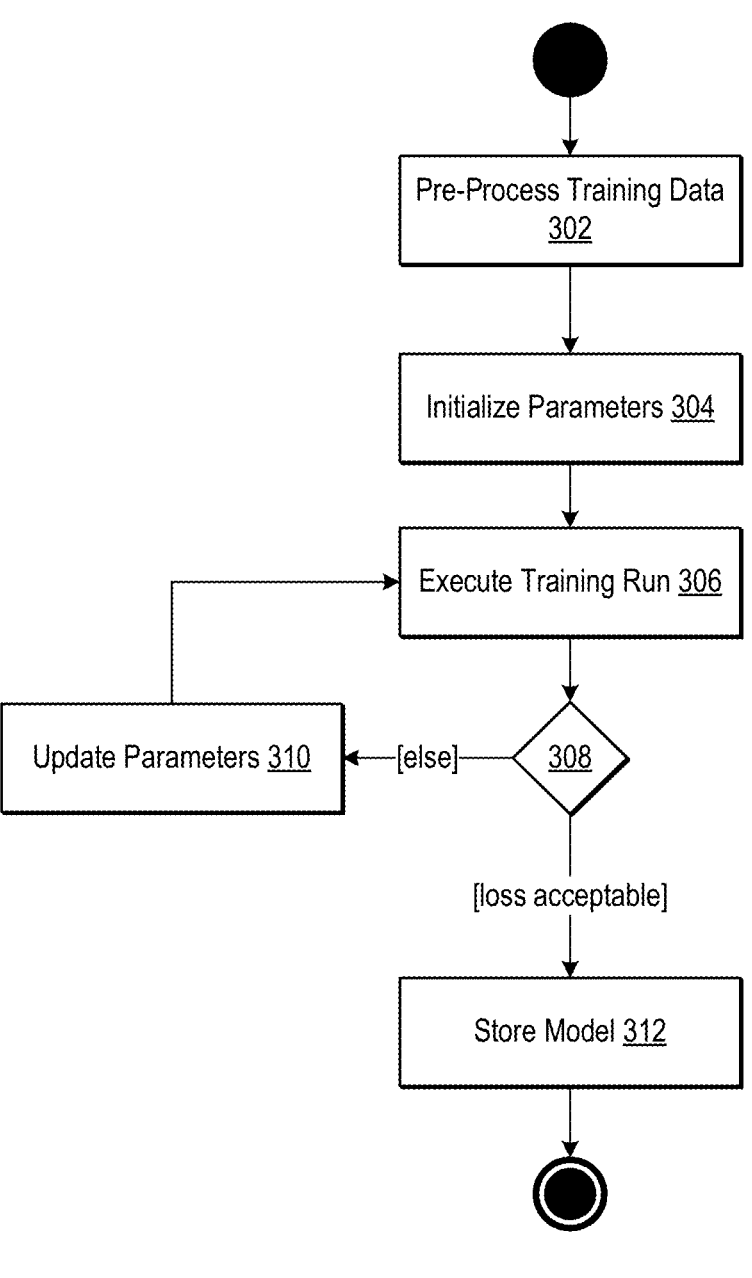
FIG. 3 is a flow diagram illustrating a method for training a learner model according to some of the example embodiments.

FIG. 3 is a flow diagram illustrating a method for training a learner model according to some of the example embodiments.

In step 302, the method can include pre-processing the training data set to remove outliers, ensure consistent data, and perform various other cleaning operations.

In this step, pre-processing refers to a series of operations applied to the raw training data set before it's used in training the learner model. Removing outliers can avoid skewing or biasing the learning process, leading the model to make inaccurate predictions or failing to generalize well to unseen data. This may involve statistical techniques to identify data points that deviate significantly from the rest. Ensuring consistent data can mean that any discrepancies or variations in data formats, scales, or units are harmonized. This could involve normalization (scaling all numerical variables to a standard range), handling missing values (either by imputation or deletion), and converting categorical variables into a format suitable for machine learning, often using techniques like one-hot encoding. These pre-processing steps ensure that the training data fed into the model is of high quality, thereby increasing the chances of the learner model achieving optimal performance.

Certain cleaning operations may also include deduplication, where any repeated data entries are removed. In some cases, feature engineering may be performed at this stage, where new features are derived from the original ones to capture underlying patterns in the data more effectively. The objective behind these operations is to create a streamlined and efficient data set that can assist the learner model in discerning patterns without being misdirected by noise or irrelevant information.

In step 304, the method can include initializing the parameters of a learner model. In some implementations, the initialization can be tuned based on past performances of the learning model. In other implementations, the parameters may be initialized to random values at the beginning of training.

In this step, initializing the parameters can determine the model's behavior and how it will adjust itself during the learning process. Starting values of these parameters can influence the training's convergence speed, the possibility of the model getting stuck in local minima, and the overall performance of the trained model.

Parameters may be initialized based on past performances when using a transfer learning approach or leveraging prior knowledge. In such cases, parameters from previously trained models, which may have been trained on similar tasks or datasets, are used as starting points. This approach can lead to faster convergence and better generalization, especially when the new training data is scarce or closely related to the previous tasks. For example, in some implementations, parameters from another user's model can be used to initialize the parameters of a current user's model.

On the other hand, initializing parameters to random values is suitable for learner models that are being trained from scratch. Random initialization ensures that each neuron or other unit in the model starts with a unique value, preventing them from updating in lockstep during training. Various methods for random initialization exist, with some ensuring that the initialized values are neither too small nor too large, as both extremes can slow down or even hinder the learning process. For instance, methods like Xavier or He initialization consider the size of the input and output layers to determine the scale of random values, ensuring a balanced start for the learning process.

As discussed, no limit is placed on the type of predictive model trained using the method. For example, the model may comprise a deep neural network (DNN) or other type of neural network. For purposes of discussion, a linear model $p(\theta)$ is used as an example having the form:

$$p(\theta) = \theta^T \phi + b,$$

where $\theta$ and b are the trainable model parameters, $\phi$ is a vector containing the measured CPAs of the past seven days. In the following examples, b is omitted for ease of description as it can also be included in θ when extending each feature vector with an entry with a constant value of one.

In step 306, the method can include executing a training run using one or more of the training examples. Each training run can generate a predicted output. In some implementations, a training run comprises inputting one example and obtaining one result. In other implementations, a training run comprises inputting multiple examples and aggregating the output predictions.

In this step, the learner model undergoes iterative adjustments by processing the training examples. The essence of executing a training run is to progressively refine the model's parameters based on differences between predicted outputs and actual data. By repeatedly exposing the model to training examples, it learns to fine-tune its predictions, with the overarching aim to minimize the discrepancy between its predictions and the true outputs.

The choice between using one example or multiple examples during a training run is often governed by the training strategy employed. When one example is inputted and one result obtained, it's known as "online" or "stochastic" training. This approach can offer faster convergence since the model is updated more frequently. However, due to the noisy nature of updates, it might also lead to more oscillatory convergence patterns.

Conversely, when multiple examples are inputted during a training run and the outputs aggregated, this is termed "batch" training. Here, the model parameters are updated based on an average of the prediction errors across all examples in the batch. This approach can stabilize the learning process, making convergence smoother. Yet, it may also require more computational resources per update, especially with large batches. An intermediate strategy, often called "mini-batch" training, seeks to balance the benefits of both approaches by updating the model using small sets of examples. This method can leverage the computational efficiencies of parallel processing while still benefiting from more frequent updates.

Loss functions serve as constructs in the training of machine learning models, quantifying how well the model's predictions align with actual outcomes. At its essence, a loss function evaluates the difference, or "loss", between the predicted value outputted by the model and the true value for a given data point. This computed loss provides feedback, guiding the optimization algorithms to adjust the model's parameters and drive the predictions closer to reality. Different tasks and model architectures often necessitate distinct loss functions, with choices like mean squared error, cross-entropy, and hinge loss being popular for regression, classification, and support vector machines, respectively. As fundamental as these functions are, innovation in the realm of loss design can lead to significant advancements in training efficacy and model robustness. Transitioning to the core of this invention, the following discussion provides a family of loss functions, specifically crafted to enhance the learning process for ratio prediction.

The example embodiments utilize a family of loss functions having the following form:

$$l(p(\theta)) = x_i f(p(\theta)) - y_i p(\theta),$$

where $p(\theta)$ is the learner model (e.g., a linear model, DNN, etc.) parameterized by θ. In the example embodiments, $f(x)$ comprises a strict convex function for the general objective to be strictly convex. Convexity is a property in optimization that ensures, for any two points within the function's domain, the line segment connecting these points lies entirely above the graph of the function. This property can be useful in machine learning, as it guarantees the presence of a single global minimum and eliminates the concern of local minima. When the function is convex, optimization algorithms can reliably converge to this global minimum, resulting in consistent and stable solutions. Ensuring that $f(x)$ is convex thus can ensure the overall objective remains convex throughout the optimization process. Further, in the disclosure, strict convexity is utilized which ensure that the derivative of the underlying function $f(x)$ is strictly increasing. As a result, a single prediction $p(\theta)$ corresponds to a single ratio prediction. This design decision not only simplifies the optimization landscape but also aids in achieving more predictable and replicable training outcomes. As a result, the minimum of the overall loss will be achieved at:

$$\frac{dL(p(\theta))}{dp(\theta)} = f'(p(\theta)) \sum_i x_i - \sum_i y_i = 0,$$

which is solved by:

$$f'(p(\theta)) = \frac{\sum_i y_i}{\sum_i x_i} = CPA$$

Here, CPA is in the range $[0, \infty)$, which can pose the requirement that $f'(x) \to [0, \infty)$ and on this range. Further, given the requirement of strict convexity, it can be guaranteed that each prediction corresponds to a unique CPA value.

In the context of the disclosed embodiments, the optimization process is driven by pinpointing parameters that substantially reduce the model's error, as articulated in the above equations. This involves discerning the optimal rate of change in relation to the model's specific parameters. Such a determination converges upon a unique point—signifying an ideal balance where the error is minimized. An integral aspect of this process is the utilization of the CPA value, which inherently emerges from the intricate relationship between two crucial data sets. For the optimization to be effectively realized, the function's slope should operate seamlessly over the extensive range represented by the CPA value. This handling of the slope ensures that the model is fine-tuned for efficiency, leading to superior and more reliable predictions.

In some implementations, the frequency of the prediction update should be adjusted according to the seasonality of a dataset. For example, aggregating the conversions on an hourly basis:

$$L_h(p(\theta)) = \sum_{i \in h} l_i(p(\theta)) = \left(\sum_{i \in h} x_i\right) f(p(\theta)) - \left(\sum_{i \in h} y_i\right) p(\theta) =$$

(hourly conversions)$(f(p(\theta)) -$ (hourly spend)$p(\theta)$

The formulation of the problem as a supervised learning problem enables the method to use various optimization techniques with performance guarantees as will be discussed in connection with FIG. 4. Furthermore, the model $p(\theta)$ can be chosen from a wide range of possibilities such as linear models, DNNs, etc.

In some implementations, as discussed, the choice of a loss function may comprise a strict convex function such that $f'(x) \to [0, \infty)$ and on this range. For such functions that have an analytic expression for their strict convex conjugate, the method can use proximal point methods to optimize the model weights during training (i.e., to minimize the loss, find the minimum of the function) due to their resilience to the step-size choice. The use of a proximal point method can further allow for tuning the step-size of training once on a small data-set and using it for a prolonged period of time.

As a recurring example of a test case of a loss function and for the following example of using a proximal point optimization algorithm, the following example loss function is provided:

$$f(x) = \frac{1}{2}x^2 + \frac{1}{2}\delta_{[0,\infty)}(x),$$

where, $$\delta_C = \{0 \, x \in C \, \infty \, x \notin C.$$

In step 308, the method can determine if a parameter update is needed based on comparing the loss of the training run to a hyperparameter of the learner model.

At this step in the training process, loss assessment plays an important role in informing whether the model's parameters necessitate adjustments. After a training run, the resultant loss value offers insights into the discrepancies between the predicted outputs and the actual targets. By juxtaposing this loss against a predefined hyperparameter threshold, the model can discern if the current set of parameters is delivering optimal results or if refinements are necessary. Typically, this threshold is indicative of the tolerance limit within which the model's performance is deemed acceptable. If the loss exceeds this hyperparameter value, it implies the model's predictions are straying beyond the acceptable margin from the actual targets, signaling the need for a parameter update (step 310). Conversely, if the loss lies within the acceptable boundaries set by the hyperparameter, the model may forgo adjustments, preserving its current parameter configuration. In some implementations, if no update is needed, the method may proceed directly to step 312.

In step 310, the method updates the parameters of the model based on the computed loss. In some implementations, the method can use optimization algorithms like gradient descent, wherein the gradient of the loss with respect to each parameter is computed. This gradient essentially points in the direction of the steepest increase in the loss function. By adjusting the model's parameters in the opposite direction of this gradient, the method minimizes the loss. The magnitude of this adjustment is often regulated by another hyperparameter known as the learning rate, which determines the step size taken in the direction opposite to the gradient. In other scenarios, however, a proximal point method can be used as described more fully in FIG. 4.

With the foregoing example of one example type of loss function, the loss function $L(\theta^T \phi)$ can be expressed as:

$$L(\theta^T \phi) =$$

$$\left(\sum_{i \in h} x_i\right) f(\theta^T \phi) - \left(\sum_{i \in h} y_i\right) \theta^T \phi = \frac{1}{2}\left(\sum_{i \in h} x_i\right)[(\theta^T \phi)^2 + \delta_{[0,\infty)}(\theta^T \phi)] - \left(\sum_{i \in h} y_i\right) \theta^T \phi.$$

In some implementations, the method, using an online algorithm that minimizes a regularized version of this loss function can use a proximal point method applied to regularized costs $$L(\theta^T \phi) + \frac{\rho}{2}\|\theta\|_2^2,$$

where $$\frac{\rho}{2}\|\theta\|_2^2$$

is the squared L2 norm (or Euclidean norm) of $\theta$.

In such an implementation, the optimization of the model comprises determining the next set of parameters for the next time step $(\theta_{t+1})$ as:

$$\theta_{t+1} = \arg\arg\left\{L(\theta^T \phi) + \frac{1}{2\eta}\|\theta - \theta_t\|^2 + \frac{\rho}{2}\|\theta\|^2\right\}$$

where $\theta_{t+1}$ represents the next iteration of trainable parameters (e.g., model weights), $L(\theta^T \phi)$ is the loss function, $$\frac{1}{2\eta}\|\theta - \theta_t\|^2$$

is a regularization term that penalizes big changes in $\theta$ from one iteration to the next (the smaller $\eta$ is, the more penalty is applied for changes in $\theta$), and $$\frac{\rho}{2}\|\theta\|^2,$$

is another regularization term, which penalizes large values of $\theta$ irrespective of its previous value, $\rho$ comprises a regularization parameter that controls the strength of this regularization, and $\eta$ is a learning rate defined by a learning rate function $\eta_t$. Both $\eta$ and $\rho$ may be tunable hyperparameters of the model training process. In some implementations, the learning rate function $\eta_t$ can be decreased at a rate of $\Theta(1/\sqrt{t})$. That is, as the iterations or time go on, the learning rate becomes inversely proportional to the square root of that time or iteration. By reducing the learning rate in this manner, the method can take larger steps in the beginning (when t is small) and gradually take smaller steps as it approaches a minimum, helping convergence.

During optimization, the method can receive a non-zero learning rate $(\eta_t > 0)$ and a non-negative regularization parameter $(\rho \geq 0)$. The method can further obtain an initial dataset $$D = \{\alpha_t, \beta_t\}_{t=0}^\infty,$$

where (as shorthand), $$\alpha = \sum_{i \in h} x_i$$

and

-continued $$\beta = \sum_{i \in h} y_i$$

During the process, the next weights are initialized to zero the method then loops until converging. During each iteration of the loop if the summation of $\alpha_t$ is zero, the method updates the next weights as:

$$\theta_{t+1} \leftarrow \frac{\theta_t + \eta_t \beta_t \phi}{1 + \eta_T \rho}$$

Otherwise, computes an update parameter based on whether $$\frac{\theta_t^T \phi}{\eta_t \|\phi\|^2} \leq -\beta_t.$$

If true, the method computes the update parameter ($\lambda$) as $$\lambda = \frac{\theta_t^T \phi}{\eta_t \|\phi\|^2}$$

If not, the method compute the update parameter as:

$$\lambda = \frac{\alpha_t \theta_t^T \phi - \beta_t (1 + \eta_t \rho)}{\alpha_t \eta_t \|\phi\|^2 + 1 + \eta_t \rho}$$

Then, the method updates the model parameters as:

$$\theta_{t+1} \leftarrow \frac{\theta_t - \eta_t \lambda \phi}{1 + \eta_t \rho}$$

The following steps are summarized below in the following pseudocode:

```
Require: D = {αₜ, βₜ}ₜ₌₀^∞, ηₜ > 0, ρ ≥ 0

θ₀ ← 0
    while True do
        if αₜ = 0 then
                    θₜ₊₁ ← (θₜ + ηₜβₜφ) / (1 + η_Tρ)
        else
            if (θₜᵀφ) / (ηₜ‖φ‖²) ≤ -βₜ
                        λ = (θₜᵀφ) / (ηₜ‖φ‖²)
            else
                        λ = (αₜθₜᵀφ - βₜ(1 + ηₜρ)) / (αₜηₜ‖φ‖² + 1 + ηₜρ)
            end if
                    θₜ₊₁ ← (θₜ - ηₜλφ) / (1 + ηₜρ)
        end if
    end while
```

Through successive iterations of this process, the model iteratively refines its parameters, striving to reach a state where the loss is minimized and predictions are as accurate as possible. As illustrated, after updating its parameters a next training run can be executed. This process may continue until an acceptable loss is reached or a maximum number of training runs occurs.

In step 312, the method can include storing the current parameters of the learning model for later inference. During the model training phase, the method can persistently store the evolving parameters or weights of the model at regular intervals or after specific milestones (e.g., minimizing loss). By saving the current parameters in step 312, the system prepares for potential deployment scenarios. This might include integration into downstream applications, real-time data analysis platforms, or other predictive systems. By having the weights readily available, it becomes straightforward to load the trained model into various environments, reducing the latency between training completion and real-world application.

Figure 4:
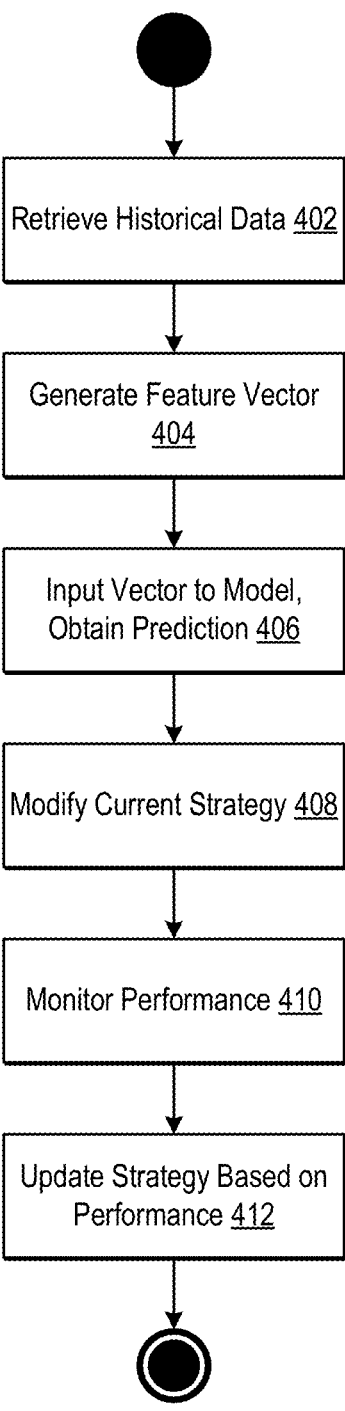
FIG. 4. is a flow diagram illustrating a method for updating a bid strategy based on a predicted CPA value according to some of the example embodiments.

FIG. 4. is a flow diagram illustrating a method for updating a bid strategy based on a predicted CPA value according to some of the example embodiments.

In step 402, the method can include retrieving historical ratio data for a user. In some implementations, the historical ratio data can include numerator data and denominator data that have a relationship. For example, the numerator data may include a number of clicks (and corresponding costs) while the denominator data may include a number of conversions.

In some implementations, step 402 can include establishing a secure connection to a data storage solution, such as a relational database or a data warehouse, that holds historical ratio data. In some implementations, the method can use a unique identifier for the user (such as user ID, account number, or email), query the database to retrieve historical data points corresponding to the specified numerator and denominator criteria. In some implementations, the method can ensure that the time-stamp or time-based metadata associated with each data point is retrieved so that the sequence and timing of the data are preserved. In some implementations, this ordering is optional. In some implementations, the method can include implementing data validation checks to ensure the integrity and consistency of the retrieved data. This could include filtering out outliers or correcting for any missing or corrupted data points. In some implementations, the method can then load the validated data into an in-memory data structure, such as an array or a list, in preparation for the next step.

Although click and conversion examples are used, the disclosure is not limited as such and other data having relationships can be used. For example, expense data (numerator) and income (denominator) can be used for credit scoring; calories consumed (numerator) and calories burned (denominator) can be used for fitness applications; renewable energy resources (numerator) and non-renewable energy resources (denominator) can be used for clean energy planning; and similar types of related data can be used.

In step 404, the method may include generating a feature vector using the historical ratio data. As one example, the method can segment the data into historical intervals and compute a ratio for each interval. For example, the method can include computing CPA values for the last seven days.

In some implementations, the method can divide the historical ratio data into time intervals. For instance, if the historical data spans a year, it can be divided into weekly, monthly, or quarterly intervals. In some implementations, finer granularity can be used such as hourly intervals. In some implementations, for each time interval, the method can compute the ratio of the numerator data to the denominator data. In some implementations, the method can include normalizing the ratios.

In step 406, the method can include inputting the feature vector into a predictive model and receiving the next time step (e.g., next hour, next day) CPA value. In some implementations, this model is the one trained using the method of FIG. 3 which is not repeated herein. In some implementations, the predictive model utilizes the derivative of the same strict convex function used when designing the loss function during training.

In some implementations, the method can load the predictive model into memory, ensuring all its parameters, weights, or coefficients (for machine learning models) are correctly initialized. The method can then initialize any hyperparameters required for the model to run, such as learning rates, dropout rates, or batch sizes if relevant. The method can then execute a forward pass through the model using the input feature vector, calculating the predicted CPA value for the next time step.

In step 408, the method can include modifying a current strategy of the user based on the output of the predictive model. As one example, if the model outputs a CPA, the method can include adjusting a current click bid to meet the CPA. In some implementations, this can include increasing, decreasing, or maintaining a current bid strategy for the user.

In some implementations, the method can retrieve the current bid strategy the user is employing. This could include current bid amounts, target demographics, ad placements, and other relevant parameters. The method may then analyze how the current strategy performed in the most recent time period (e.g., the last hour or day) in terms of CPA.

In some implementations, the method can compare the predicted CPA from the model with the user's target click bid or any predefined benchmarks and determine whether the predicted CPA is higher, lower, or around the same level. If the predicted CPA is higher than the target, the method can reduce the bid amount to potentially lower costs. Conversely, if the predicted CPA is lower than the target, the method may increase the bid to capture more valuable placements without exceeding the budget. In some implementations, the method can factor in other constraints like the daily or hourly budget caps, ensuring that any bid adjustments still keep the ad spending within these limits. Beyond just bid adjustments, the method can implement other operations. For instance, if the predicted CPA is very high, the method can shift the ad placements or targeting different demographics. For advanced strategies, the method can utilize multi-armed bandit algorithms or other optimization techniques to explore different bid amounts or strategies and exploit the ones that seem most promising. In any scenario, the method can include updating an ad platform's settings with the new bid amounts and other strategic parameters and can ensure that changes are propagated in real-time or at least by the start of the next time period for which the prediction was made.

In step 410, the method can monitor the performance of the prediction. In some implementations, after step 408 an ad campaign can be run and the method can determine the current CPA based on the updated bid strategy.

As the ad campaign runs with the adjusted bid strategy, the method can collect real-time data on the actual CPA achieved. This involves monitoring both the cost (from the clicks) and the conversions. After the specified time period (e.g., the next hour or day) has elapsed, the method can compare the actual CPA achieved to the predicted CPA and compute the defined performance metrics to quantify the prediction's accuracy.

In some implementations, the method can implement automated anomaly detection algorithms to identify and alert if the deviation between the predicted and actual CPA surpasses a predefined threshold. Such deviations might indicate issues either with the prediction model or with the ad campaign's execution. In some implementations, the method can use the difference between predicted and actual CPA to refine and improve the predictive model. This feedback loop can ensure the model remains accurate and relevant as market dynamics change. In some implementations, if deviations between predictions and actual values consistently surpass acceptable limits, the method can retrain the predictive model (FIG. 3) with the latest data.

In step 412, the method can continuously update the bid strategy based on real-time performance of the bid strategy. As discussed above, the method can re-run the training process on fresh data to re-compute the next CPA, and thus can execute step 412 for a next time step, performing the foregoing functions again until an ad campaign is completed.

Figure 5:
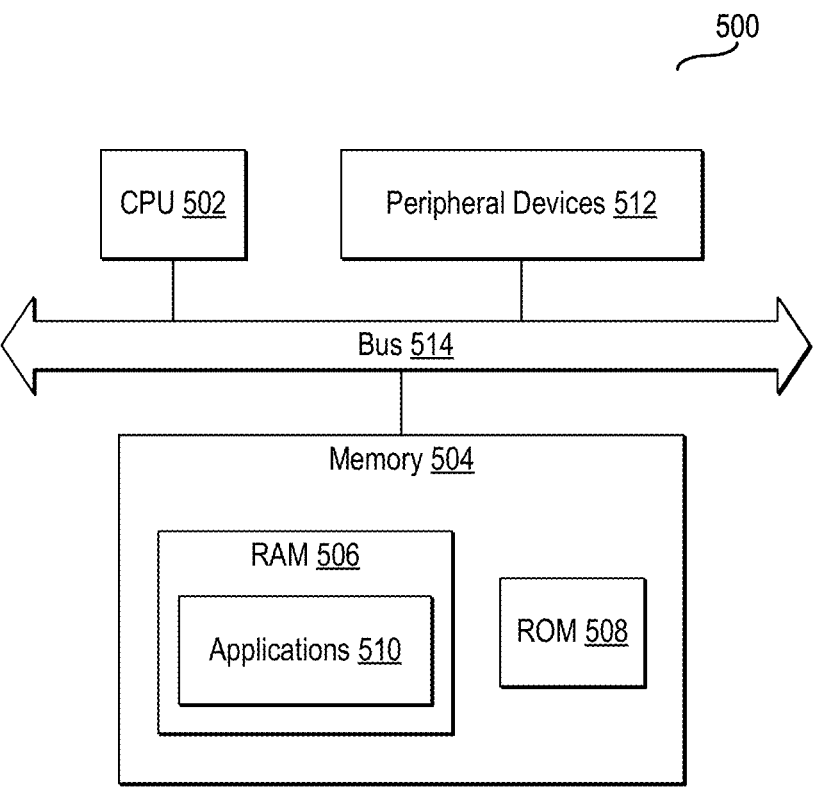
FIG. 5 is a block diagram of a computing device according to some embodiments of the disclosure.

FIG. 5 is a block diagram of a computing device according to some embodiments of the disclosure.

As illustrated, the device 500 includes a processor or central processing unit (CPU) such as CPU 502 in communication with a memory 504 via a bus 514. The device also includes one or more input/output (I/O) or peripheral devices 512. Examples of peripheral devices include, but are not limited to, network interfaces, audio interfaces, display devices, keypads, mice, keyboard, touch screens, illuminators, haptic interfaces, global positioning system (GPS) receivers, cameras, or other optical, thermal, or electromagnetic sensors.

In some embodiments, the CPU 502 may comprise a general-purpose CPU. The CPU 502 may comprise a single-core or multiple-core CPU. The CPU 502 may comprise a system-on-a-chip (SoC) or a similar embedded system. In some embodiments, a graphics processing unit (GPU) may be used in place of, or in combination with, a CPU 502. Memory 504 may comprise a memory system including a dynamic random-access memory (DRAM), static random-access memory (SRAM), Flash (e.g., NAND Flash), or combinations thereof. In one embodiment, the bus 514 may comprise a Peripheral Component Interconnect Express (PCIe) bus. In some embodiments, the bus 514 may comprise multiple busses instead of a single bus.

Memory 504 illustrates an example of a non-transitory computer storage media for the storage of information such as computer-readable instructions, data structures, program modules, or other data. Memory 504 can store a basic input/output system (BIOS) in read-only memory (ROM), such as ROM 508 for controlling the low-level operation of the device. The memory can also store an operating system in random-access memory (RAM) for controlling the operation of the device.

Applications 510 may include computer-executable instructions which, when executed by the device, perform any of the methods (or portions of the methods) described previously in the description of the preceding figures. In some embodiments, the software or programs implementing the method embodiments can be read from a hard disk drive (not illustrated) and temporarily stored in RAM 506 by CPU 502. CPU 502 may then read the software or data from RAM 506, process them, and store them in RAM 506 again.

The device may optionally communicate with a base station (not shown) or directly with another computing device. One or more network interfaces in peripheral devices 512 are sometimes referred to as a transceiver, transceiving device, or network interface card (NIC).

An audio interface in peripheral devices 512 produces and receives audio signals such as the sound of a human voice. For example, an audio interface may be coupled to a speaker and microphone (not shown) to enable telecommunication with others or generate an audio acknowledgment for some action. Displays in peripheral devices 512 may comprise liquid crystal display (LCD), gas plasma, light-emitting diode (LED), or any other type of display device used with a computing device. A display may also include a touch-sensitive screen arranged to receive input from an object such as a stylus or a digit from a human hand.

A keypad in peripheral devices 512 may comprise any input device arranged to receive input from a user. An illuminator in peripheral devices 512 may provide a status indication or provide light. The device can also comprise an input/output interface in peripheral devices 512 for communication with external devices, using communication technologies, such as USB, infrared, Bluetooth®, or the like. A haptic interface in peripheral devices 512 provides tactile feedback to a user of the client device.

A GPS receiver in peripheral devices 512 can determine the physical coordinates of the device on the surface of the Earth, which typically outputs a location as latitude and longitude values. A GPS receiver can also employ other geo-positioning mechanisms, including, but not limited to, triangulation, assisted GPS (AGPS), E-OTD, CI, SAI, ETA, BSS, or the like, to further determine the physical location of the device on the surface of the Earth. In one embodiment, however, the device may communicate through other components, providing other information that may be employed to determine the physical location of the device, including, for example, a media access control (MAC) address, Internet Protocol (IP) address, or the like.

The device may include more or fewer components than those shown, depending on the deployment or usage of the device. For example, a server computing device, such as a rack-mounted server, may not include audio interfaces, displays, keypads, illuminators, haptic interfaces, Global Positioning System (GPS) receivers, or cameras/sensors. Some devices may include additional components not shown, such as graphics processing unit (GPU) devices, cryptographic co-processors, artificial intelligence (AI) accelerators, or other peripheral devices.

The subject matter disclosed above may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The preceding detailed description is, therefore, not intended to be taken in a limiting sense.

Throughout the specification and claims, terms may have nuanced meanings suggested or implied in context beyond an explicitly stated meaning. Likewise, the phrase "in an embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and," "or," or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The present disclosure is described with reference to block diagrams and operational illustrations of methods and devices. It is understood that each block of the block diagrams or operational illustrations, and combinations of blocks in the block diagrams or operational illustrations, can be implemented by means of analog or digital hardware and computer program instructions. These computer program instructions can be provided to a processor of a general-purpose computer to alter its function as detailed herein, a special purpose computer, application-specific integrated circuit (ASIC), or other programmable data processing apparatus, such that the instructions, which execute via the processor of the computer or other programmable data processing apparatus, implement the functions/acts specified in the block diagrams or operational block or blocks. In some alternate implementations, the functions or acts noted in the blocks can occur out of the order noted in the operational illustrations. For example, two blocks shown in succession can in fact be executed substantially concurrently or the blocks can sometimes be executed in the reverse order, depending upon the functionality or acts involved.

We claim:

1. A method comprising:

receiving, by a processor, a training data set, the training data set comprising data representing consumer interactions and actions taken by consumers after the consumer interactions;

executing, by the processor, a training run using a predictive model, the predictive model including a plurality of trainable parameters;

computing, by the processor, a loss of the training run using a loss function, the loss function comprising a strict convex function wherein the derivative of the loss function equals a ratio of summed outcomes to summed interactions at optimum;

optimizing, by the processor, the plurality of trainable parameters based on an output of the loss function using a proximal point method that iteratively updates parameters by minimizing a combination of the loss function and a regularization term penalizing parameter changes, wherein the proximal point method comprises updating the plurality of trainable parameters by iteratively solving a regularized subproblem at each iteration, the regularized subproblem including a proximity term that limits deviation of updated parameters from parameters of a previous iteration and a penalty term that limits magnitude of the updated parameters;

storing, by the processor, the trainable parameters as an inference model wherein the predicted ratio corresponds to an inverse of the derivative of the strict convex function; and predicting, by the processor, a future ratio using the inference model.

2. The method of claim 1, wherein the loss function is selected from a family of functions within a function space defined by a difference between outcomes of actions taken after consumer interactions multiplied by a strict convex function of the predicted outcome and the predicted outcome of the consumer interactions.

3. The method of claim 2, wherein the outcomes of actions are computed by computing a total number of actions within a predetermined time period and where the consumer interactions are computed by summing a total number of consumer interactions in the predetermined time period.

4. The method of claim 1, wherein optimizing the plurality of trainable parameters based on an output of the loss function comprises minimizing a regularized version of the loss function after the training run.

5. The method of claim 4, wherein minimizing a regularized version of the loss function after the training run comprises utilizing a proximal point method.

6. The method of claim 5, wherein the plurality of trainable parameters are updated to next trainable parameters by finding a minimum value of a combination of the loss function, a first regularization term that represents a deviation between the plurality of trainable parameters and previous trainable parameters, and a second regularization term that evaluates a magnitude of the plurality of trainable parameters.

7. The method of claim 1, wherein the method further comprises updating a bid for a future user interaction using the future ratio.

8. A non-transitory computer-readable storage medium for tangibly storing computer program instructions capable of being executed by a computer processor, the computer program instructions defining steps of:

receiving a training data set, the training data set comprising data representing consumer interactions and actions taken by consumers after the consumer interactions;

executing a training run using a predictive model, the predictive model including a plurality of trainable parameters;

computing a loss of the training run using a loss function, the loss function comprising a strict convex function wherein the derivative of the loss function equals a ratio of summed outcomes to summed interactions at optimum;

optimizing the plurality of trainable parameters based on an output of the loss function using a proximal point method that iteratively updates parameters by minimizing a combination of the loss function and a regularization term penalizing parameter changes, wherein the proximal point method comprises updating the plurality of trainable parameters by iteratively solving a regularized subproblem at each iteration, the regularized subproblem including a proximity term that limits deviation of updated parameters from parameters of a previous iteration and a penalty term that limits magnitude of the updated parameters;

storing the trainable parameters as an inference model wherein the predicted ratio corresponds to an inverse of the derivative of the strict convex function; and predicting a future ratio using the inference model.

9. The non-transitory computer-readable storage medium of claim 8, wherein the loss function is selected from a family of functions within a function space defined by a difference between outcomes of actions taken after consumer interactions multiplied by a strict convex function of the predicted outcome and the predicted outcome of the consumer interactions.

10. The non-transitory computer-readable storage medium of claim 9, wherein the outcomes of actions are computed by computing a total number of actions within a predetermined time period and where the consumer interactions are computed by summing a total number of consumer interactions in the predetermined time period.

11. The non-transitory computer-readable storage medium of claim 8, wherein optimizing the plurality of trainable parameters based on an output of the loss function comprises minimizing a regularized version of the loss function after the training run.

12. The non-transitory computer-readable storage medium of claim 11, wherein minimizing a regularized version of the loss function after the training run comprises utilizing a proximal point method.

13. The non-transitory computer-readable storage medium of claim 12, wherein the plurality of trainable parameters are updated to next trainable parameters by finding a minimum value of a combination of the loss function, a first regularization term that represents a deviation between the plurality of trainable parameters and previous trainable parameters, and a second regularization term that evaluates a magnitude of the plurality of trainable parameters.

14. The non-transitory computer-readable storage medium of claim 8, wherein the steps further comprise updating a bid for a future user interaction using the future ratio.

15. A device comprising:

a processor; and a storage medium for tangibly storing thereon logic for execution by the processor, the logic comprising instructions for:

receiving a training data set, the training data set comprising data representing consumer interactions and actions taken by consumers after the consumer interactions, executing a training run using a predictive model, the predictive model including a plurality of trainable parameters, computing a loss of the training run using a loss function, the loss function comprising a strict convex function wherein the derivative of the loss function equals a ratio of summed outcomes to summed interactions at optimum, optimizing the plurality of trainable parameters based on an output of the loss function using a proximal point method that iteratively updates parameters by minimizing a combination of the loss function and a regularization term penalizing parameter changes, wherein the proximal point method comprises updating the plurality of trainable parameters by iteratively solving a regularized subproblem at each iteration, the regularized subproblem including a proximity term that limits deviation of updated parameters from parameters of a previous iteration and a penalty term that limits magnitude of the updated parameters, storing the trainable parameters as an inference model wherein the predicted ratio corresponds to an inverse of the derivative of the strict convex function, and predicting a future ratio using the inference model.

16. The device of claim 15, wherein the loss function is selected from a family of functions within a function space defined by a difference between outcomes of actions taken after consumer interactions multiplied by a strict convex function of the predicted outcome and the predicted outcome of the consumer interactions.

17. The device of claim 16, wherein the outcomes of actions are computed by computing a total number of actions within a predetermined time period and where the consumer interactions are computed by summing a total number of consumer interactions in the predetermined time period.

18. The device of claim 15, wherein optimizing the plurality of trainable parameters based on an output of the loss function comprises minimizing a regularized version of the loss function after the training run.

19. The device of claim 18, wherein minimizing a regularized version of the loss function after the training run comprises utilizing a proximal point method.

20. The device of claim 19, wherein the plurality of trainable parameters are updated to next trainable parameters by finding a minimum value of a combination of the loss function, a first regularization term that represents a deviation between the plurality of trainable parameters and previous trainable parameters, and a second regularization term that evaluates a magnitude of the plurality of trainable parameters.

* * * * *